US 6,628,003 B2

(12) United States Patent
Vinchici

(10) Patent No.: US 6,628,003 B2
(45) Date of Patent: Sep. 30, 2003

(54) PRIME MOVER FOR POWERING AN ELECTRICAL GENERATOR

(76) Inventor: Ionel Vinchici, 69-60 64th St. Apt. 2-R, Glendale, NY (US) 11385

( * ) Notice: Subject to any disclaimer, the term of this patent is extended or adjusted under 35 U.S.C. 154(b) by 46 days.

(21) Appl. No.: 10/011,001

(22) Filed: Dec. 3, 2001

(65) Prior Publication Data

US 2002/0089183 A1 Jul. 11, 2002

Related U.S. Application Data

(60) Provisional application No. 60/250,373, filed on Dec. 1, 2000.

(51) Int. Cl.$^7$ ................................................. F03G 3/02
(52) U.S. Cl. .................... 290/1 R; 290/30 A; 290/30 B
(58) Field of Search .............................. 290/1 R, 30 A, 290/30 B

(56) References Cited

U.S. PATENT DOCUMENTS 4,269,286 A * 5/1981 Ishii et al. .................. 187/292

FOREIGN PATENT DOCUMENTS

| FR | 2606093 A1 | * | 5/1988 | ............. F03G/3/06 |
|---|---|---|---|---|
| JP | 08240176 A | * | 9/1996 | ............. F03G/3/00 |
| KR | 2002004486 A | * | 1/2002 | ............. F03G/7/08 |
| RU | 486420 A | * | 1/1976 | ............. H02J/9/06 |

* cited by examiner

*Primary Examiner*—Joseph Waks

(57) ABSTRACT

A prime mover that stores mechanical energy in case of an electrical failure. When an electrical failure occurs, the prime mover is activated either automatically by a computer with a battery back-up or manually. The prime mover oscillates back and forth in a pendulum type fashion which in turn drives an electrical generator in order to produce electricity. The prime mover includes a base, elements that are rotatably mounted to the base, a pick-up balance that is rotatably mounted to the base, and a drive train that operatively connects the prime mover to the electrical generator.

6 Claims, 5 Drawing Sheets

PRIME MOVER FOR POWERING AN ELECTRICAL GENERATOR

CROSS REFERENCE TO RELATED APPLICATIONS

This application is a regular application of provisional application No. 60/250,373, filed Dec. 1, 2000, entitled Natural Motion Energy Saver, by Ionel Vinchici, and to be incorporated herein by reference thereto.

BACKGROUND OF THE INVENTION

1. Field of the Invention

The present invention relates to a prime mover. More particularly, the present invention relates to a primer mover for powering an electrical generator.

2. Description of the Prior Art

Numerous innovations for prime movers have been provided in the prior art. Even though these innovations may be suitable for the specific individual purposes to which they address, however, they differ from the present invention as heretofore described.

SUMMARY OF THE INVENTION

ACCORDINGLY, AN OBJECT of the present invention is to provide a prime mover for powering an electrical generator that avoids the disadvantages of the prior art.

ANOTHER OBJECT of the present invention is to provide a prime mover for powering an electrical generator that is simple to use.

BRIEFLY STATED, STILL ANOTHER OBJECT of the present invention is to provide a prime mover that stores mechanical energy in case of an electrical failure. When an electrical failure occurs, the prime mover is activated either automatically by a computer with a battery back-up or manually. The prime mover oscillates back and forth in a pendulum type fashion, which in turn drives an electrical generator in order to produce electricity. The prime mover comprises a base, elements that are rotatably mounted to the base, a pick-up balance that is rotatably mounted to the base, and a drive train that operatively connects the prime mover to the electrical generator.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

Figure 1:
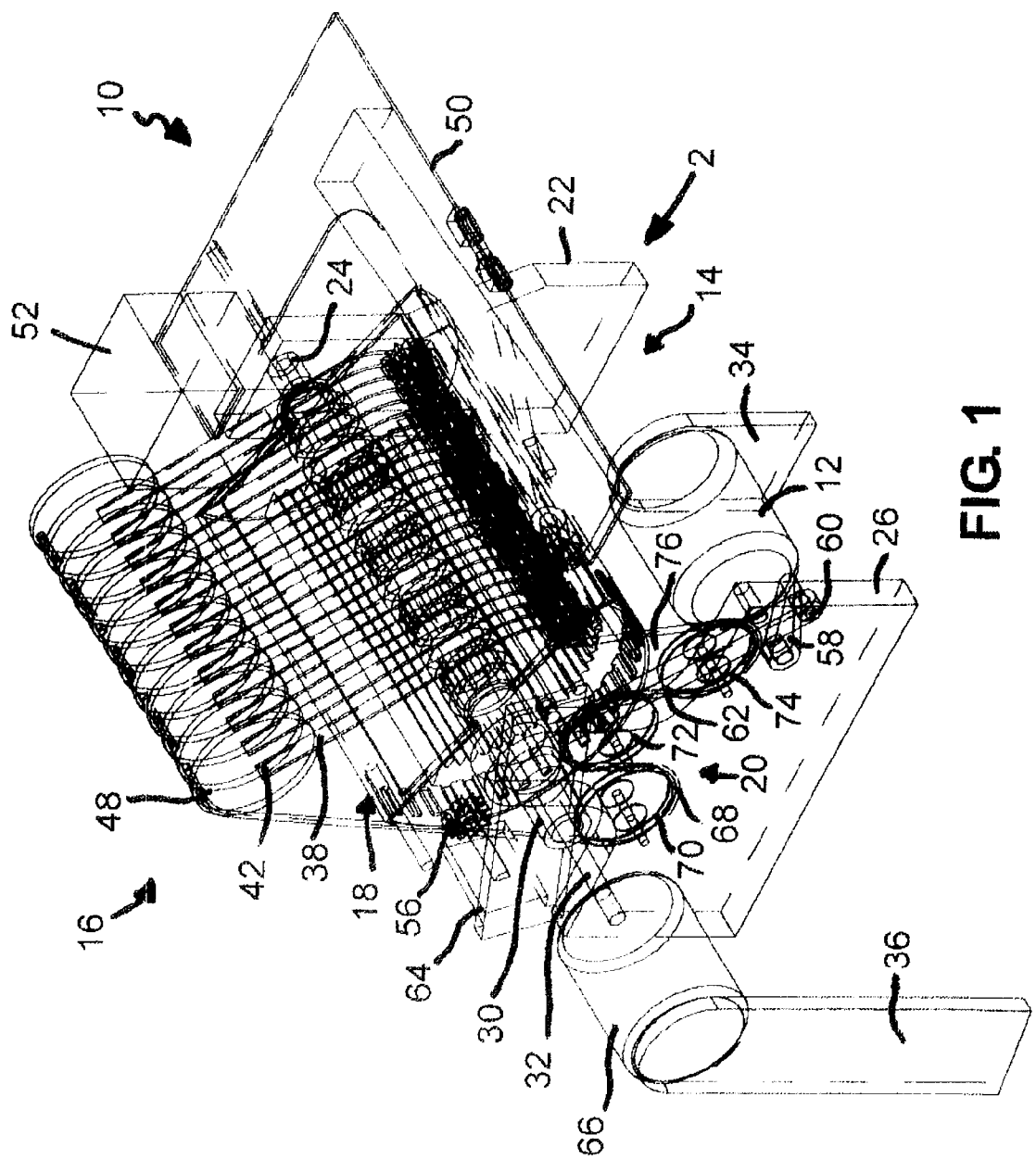
FIG. 1 is a diagrammatic perspective view of the present invention.

LIST OF REFERENCE NUMERALS UTILIZED IN THE DRAWING 10 prime mover of present invention for powering electrical generator 12
12 electrical generator
14 base
16 elements
18 pick-up balance
20 drive train for operatively connecting prime mover 10 to electrical generator 12
22 rear end support of base 14
24 throughbore in rear end support 22 of base 14
26 front end support of base 14
28 throughbore in front end support 26 of base 14
30 main axle sleeve of base 14
32 main axle of base 14
34 generator support of base 14 for supporting electrical generator 12
36 reset motor support of base 14
38 plurality of element arms of elements 16
40 first ends of plurality of element arms 38 of elements 16
42 second ends of plurality of element arms 38 of elements 16
44 element clutch of elements 16
46 element gear of elements 16
48 plurality of element weights of elements 16
50 primary balance of elements 16
52 counter balance of elements 16
54 pivot of elements 16
56 pick-up balance gear of elements 16
58 generator arm of drive train 20 for connecting to electrical generator 12
60 generator arm axle of drive train 20
62 following arm of drive train 20
64 driving arm of drive train 20
66 reset motor of drive train 20
68 pulley system of drive train 20
70 first pulley of pulley system 68 of drive train 20
72 second pulley of pulley system 68 of drive train 20
74 third pulley of pulley system 68 of drive train 20 for connecting to electrical generator 12
76 cable of pulley system 68 of drive train 20

DETAILED DESCRIPTION OF THE PREFERRED EMBODIMENT

Figure 2:
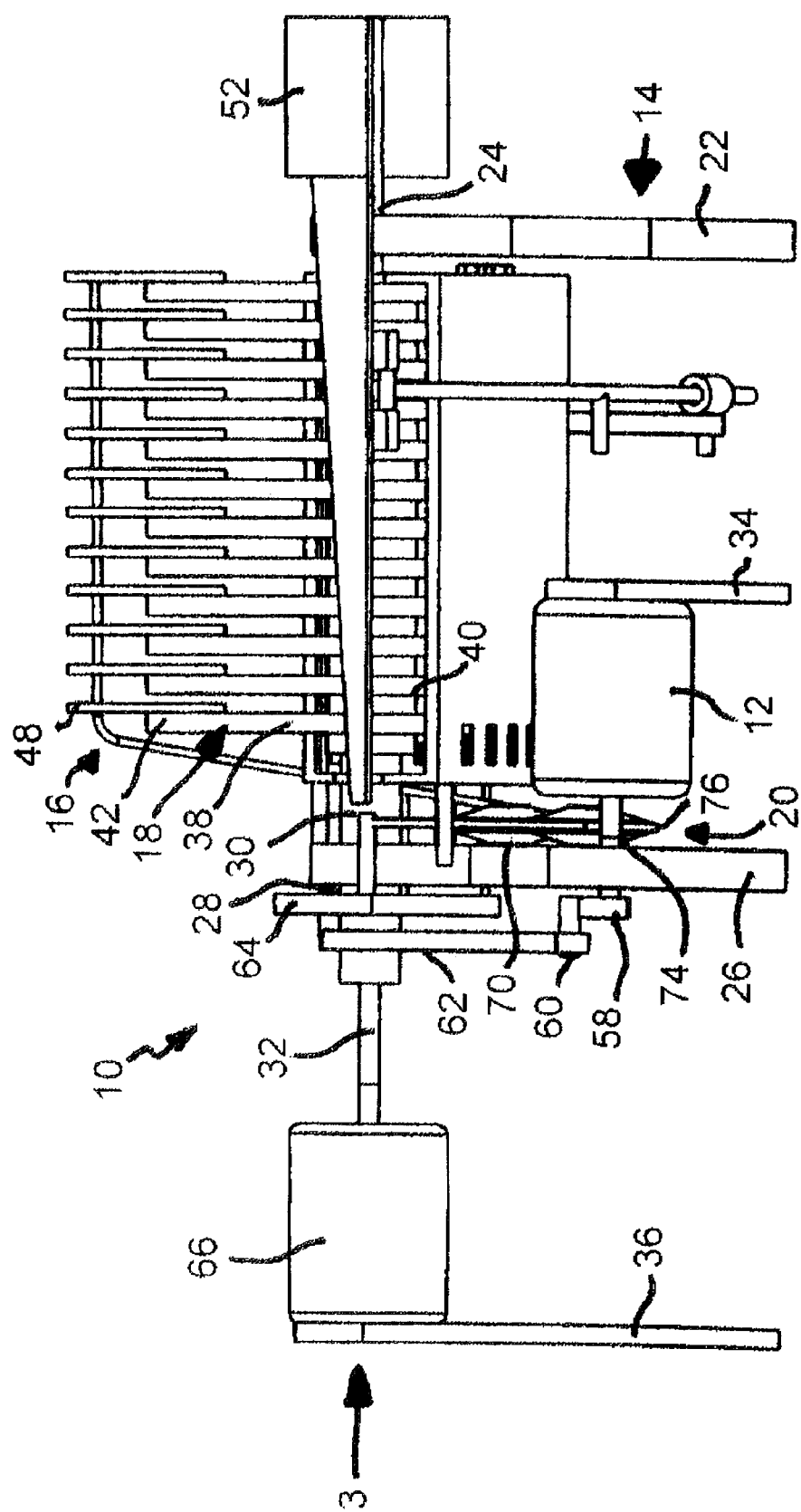
FIG. 2 is a diagrammatic side elevational view taken generally in the direction of ARROW 2 in FIG. 1.
Figure 3:
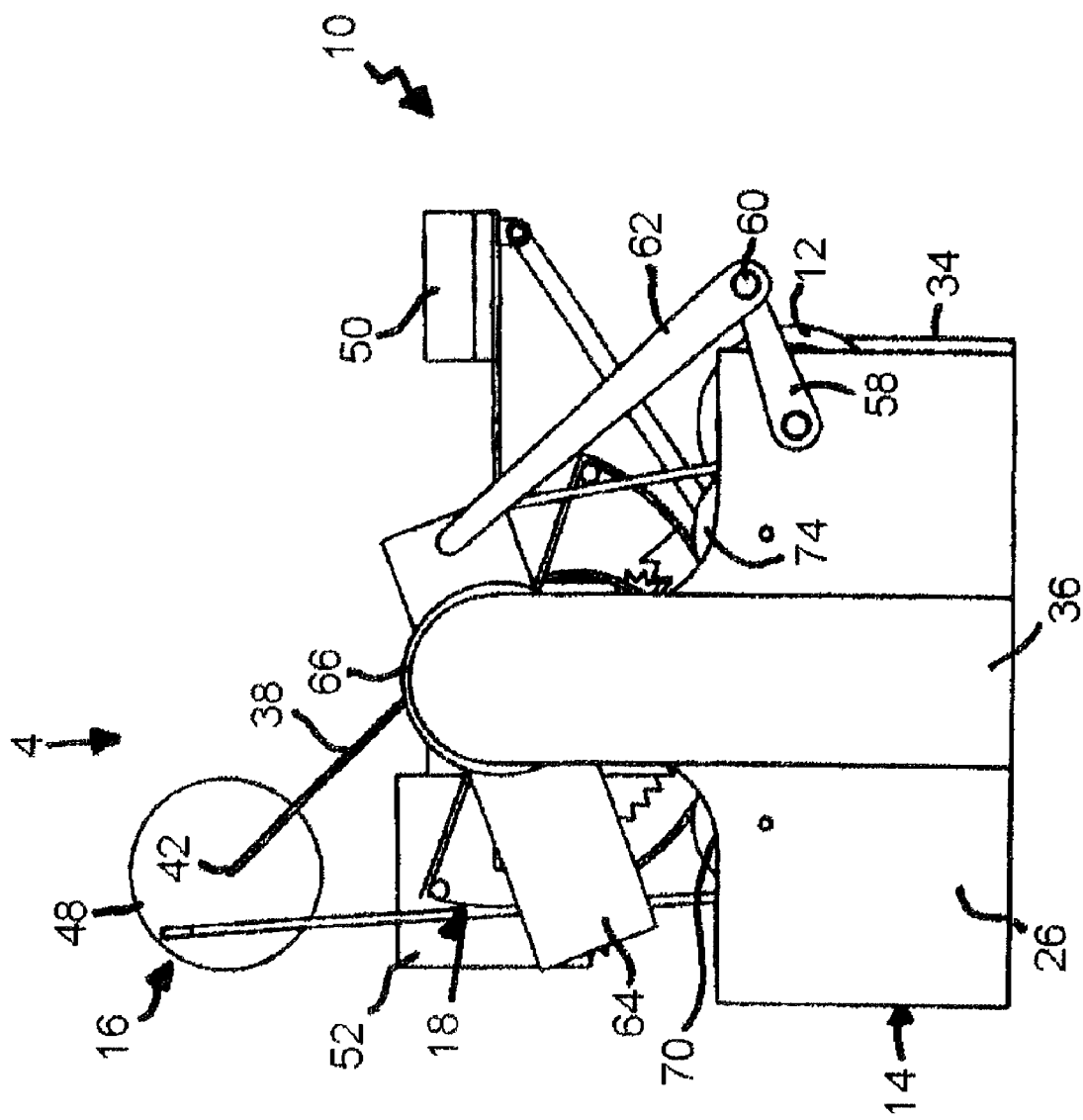
FIG. 3 is a diagrammatic side front view taken generally in the direction of ARROW 3 in FIG. 2.
Figure 4:
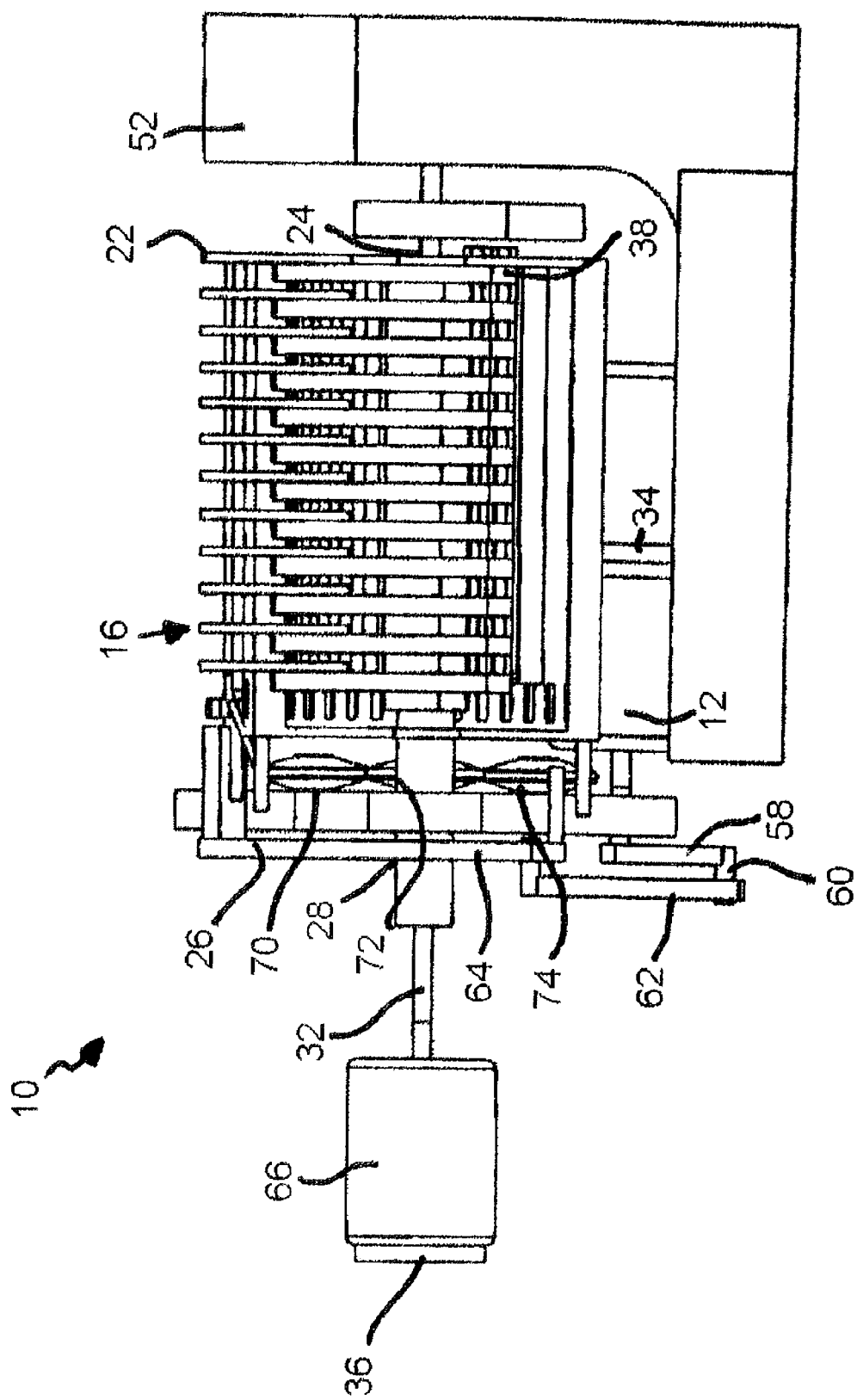
FIG. 4 is a diagrammatic top plan view taken generally in the direction of ARROW 4 in FIG. 3.
Figure 5:
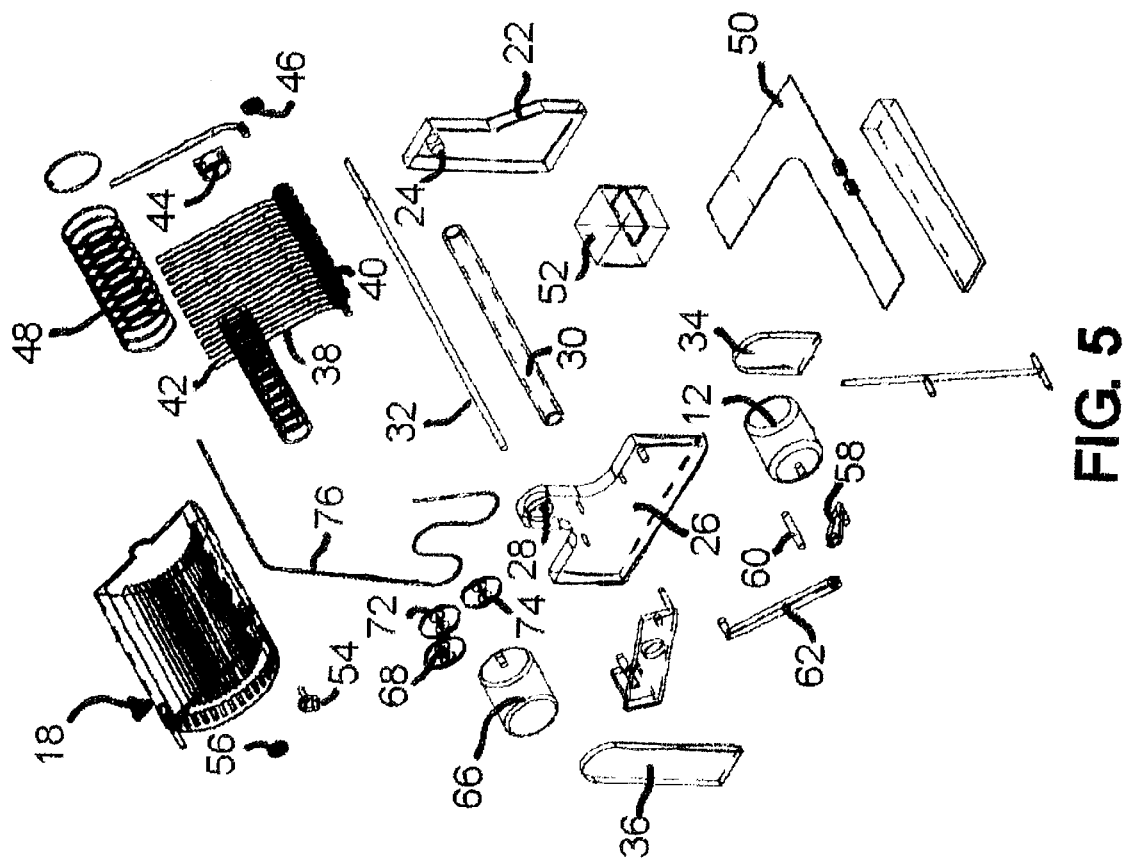
FIG. 5 is an exploded diagrammatic perspective of the present invention shown in FIGS. 1–4.

Referring now to the drawings, and particularly to FIGS. 1–5, the prime mover of the present invention is shown generally at 10 for powering an electrical generator 12.

The prime mover 10 stores mechanical energy in case of an electrical failure. When an electrical failure occurs, the prime mover 10 is activated either automatically by a computer with a battery back-up or manually. The prime mover 10 oscillates back and forth in a pendulum type fashion, which in turn drives the electrical generator 12 in order to produce electricity.

The prime mover 10 comprises a base 14, elements 16 that are rotatably mounted to the base 14, a pick-up balance 18 that is rotatably mounted to the base 14, and a drive train 20 for operatively connecting the prime mover 10 to the electrical generator 12.

The base 14 comprises a rear end support 22 that has a throughbore 24, a front end support 26 that has a throughbore 28, a main axle sleeve 30 that extends through the throughbore 24 in the rear end support 22 and the throughbore 28 in the front end support 26, a main axle 32 that extends through the main axle sleeve 30, a generator support 34 that is spaced behind the front end support 26 and is for supporting the electrical generator 12, and a reset motor support 36 that is spaced in front of the front end support 26.

The elements 16 comprise a plurality of element arms 38 that have first ends 40 that rotatably receive the main axle sleeve 30 and second ends 42, an element clutch 44 that operatively connects the plurality of element arms 38 to the main axle sleeve 30, an element gear 46 that is attached to the main axle sleeve 30, a plurality of element weights 48 that are connected to the second ends 42 of the plurality of element arms 38, a primary balance 50, and a counter balance 52.

The amount of the electricity produced is proportional to the amount of the plurality of weights 48 used in the plurality of element arms 38 and the pick-up balance 18. For example, a small office may require the plurality of weights 48 to be one ton each (the plurality of element arms 38 to be twelve elements) and the pick-up balance 18 to be 12 tons.

The pick-up balance 18 rotatably receives the main sleeve 30, is operatively connected to the plurality of element arms 38, via a pivot 54, and has a pick-up balance gear 56 that is operatively connected thereto.

The drive train 20 comprises a generator arm 58 that is disposed in front of the front end support 26 and is for connecting to the electrical generator 12, a generator arm axle 60 that is operatively connected to the generator arm 58, a following arm 62 that is operatively connected to the generator arm 58 by the generator arm axle 60 so as to form a crank therewith, and a driving arm 64 that is operatively connected to the following arm 58 and receives the main axle sleeve 30.

The drive train 20 further comprises a reset motor 66 that extends between the front end support 26 and the reset motor support 36, is operatively connected to the main axle 30, and is controlled by a computer to reset the prime mover 10 once electric power has been restored.

The drive train 20 further comprises a pulley system 68 that comprises a first pulley 70 that is attached to the reset motor 66, a second pulley 72 that is attached to the main axle 30, and a third pulley 74 that is for connecting to the electrical generator 12, and a cable 76 that operatively connects the first pulley 70, the second pulley 72, and the third pulley 74 together.

At a starting position, the plurality of element arms 38 rotate one at a time counterclockwise until they rest on the pick-up balance 18. Once all of the plurality of element arms 38 rest on the pick-up balance 18 so as to form an entire balance (i.e. the plurality of element arms 38 and the pick-up balance 18), the entire balance rotates counter clockwise and causes the cable 76 to rotate each of the plurality of element arms 38 in turn clockwise back to the starting position so as to form oscillating rotations that form a progression. The progression is repeated until the plurality of element arms 38 and the pick-up balance 18 find equilibrium due to losses. The oscillating rotations drive the crank which is operatively connected to the electrical generator 12 which produces the electricity.

It will be understood that each of the elements described above, or two or more together, may also find a useful application in other types of constructions differing from the types described above.

While the invention has been illustrated and described as embodied in a prime mover for powering an electrical generator, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A prime mover for powering an electrical generator, comprising:
   a) a base;
   b) elements;
   c) a pick-up balance; and
   d) a drive train;
   wherein said elements are rotatably mounted to said base;
   wherein said pick-up balance is rotatably mounted to said base;
   wherein said drive train is for operatively connecting said prime mover to the electrical generator;
   wherein said base comprises a rear end support;
   wherein said rear end support has a throughbore;
   wherein said base comprises a front end support;
   wherein said front end support has a throughbore;
   wherein said base comprises a main axle sleeve;
   wherein said main axle sleeve extends through said throughbore in said rear end support;
   wherein said main axle sleeve extends through said throughbore in said front end support;
   wherein said base comprises a main axle;
   wherein said main axle extends through said main axle sleeve;
   wherein said base comprises a generator support;
   wherein said generator support is spaced behind said front end support;
   wherein said generator support is for supporting the electrical generator;
   wherein said base comprises a reset motor support; and
   wherein said reset motor is spaced in front of said front end support.

2. The mover as defined in claim 1, wherein said elements comprise a plurality of element arms;
   wherein said plurality of arms have first ends;
   wherein said first ends of said plurality of arms rotatably receive said main axle sleeve;
   wherein said plurality of arms have second ends;
   wherein said elements comprise an element clutch wherein said element clutch operatively connects said plurality of element arms to said main axle sleeve;
   wherein said elements comprise an element gear;
   wherein said element gear is attached to said main axle sleeve;
   wherein said elements comprise a plurality of element weights;
   wherein said plurality of element weights are connected to said second ends of said plurality of element arms;
   wherein said elements comprise a primary balance;
   wherein said elements comprise a counter balance; and
   wherein amount of electricity produced is proportional to amount of said plurality of weights used in said plurality of element arms and said pick-up balance.

3. The mover as defined in claim 2, wherein said pick-up balance rotatably receives said main sleeve;
   wherein said pick-up balance has a pivot;
   wherein said pick-up balance is operatively connected to said plurality of element arms via said pivot;

wherein said pick-up balance has a pick-up balance gear; and wherein said pick-up balance gear is operatively connected to said pick-up balance.

4. The mover as defined in claim 1, wherein said drive train comprises a generator arm;

wherein said generator arm is disposed in front of said front end support;

wherein said generator arm is for connecting to the electrical generator;

wherein said drive train comprises a generator arm axle;

wherein said generator arm axle is operatively connected to said generator arm;

wherein said drive train comprises a following arm;

wherein said following arm is operatively connected to said generator arm by said generator arm axle;

wherein said following arm forms a crank with said generator arm;

wherein said drive train comprises a driving arm;

wherein said driving arm is operatively connected to said following arm; and wherein said driving arm receives said main axle sleeve.

5. The mover as defined in claim 1, wherein said drive train comprises a reset motor;

wherein said reset motor extends between said front end support and said reset motor support;

wherein said reset motor is operatively connected to said main axle; and wherein said reset motor is controlled by a computer to reset said prime mover once electric power has been restored.

6. The mover as defined in claim 5, wherein said drive train comprises a pulley system;

wherein said pulley system comprises a first pulley;

wherein said first pulley is attached to said reset motor;

wherein said pulley system comprises a second pulley;

wherein said second pulley is attached to said main axle;

wherein said pulley system comprises a third pulley;

wherein said third pulley is for connecting to the electrical generator;

wherein said pulley system comprises a cable; and wherein said cable operatively connects said first pulley, said second pulley, and said third pulley together.

* * * * *